US012756056B2

(12) United States Patent
Choi et al.

(10) Patent No.: US 12,756,056 B2
(45) Date of Patent: Oct. 6, 2026

(54) BATTERY PACK INCLUDING A FIRST BATTERY MODULE AND A SECOND BATTERY MODULE

(71) Applicant: LG ENERGY SOLUTION, LTD., Seoul (KR)

(72) Inventors: Jonghwa Choi, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 807 days.

(21) Appl. No.: 17/760,902

(22) PCT Filed: Feb. 4, 2021

(86) PCT No.: PCT/KR2021/001484
§ 371 (c)(1),
(2) Date: Mar. 16, 2022

(87) PCT Pub. No.: WO2021/201409
PCT Pub. Date: Oct. 7, 2021

(65) Prior Publication Data

US 2022/0352595 A1 Nov. 3, 2022

(30) Foreign Application Priority Data

Apr. 1, 2020 (KR) ........................ 10-2020-0039759

(51) Int. Cl.
*H01M 50/342* (2021.01)
*H01M 50/211* (2021.01)
(Continued)

(52) U.S. Cl.
CPC ....... *H01M 50/342* (2021.01); *H01M 50/211* (2021.01); *H01M 50/233* (2021.01); *H01M 50/271* (2021.01)

(58) Field of Classification Search
CPC ............. H01M 50/342; H01M 50/211; H01M 50/271; H01M 50/233
See application file for complete search history.

(56) References Cited

U.S. PATENT DOCUMENTS

2010/0215998 A1 8/2010 Byun et al.
2012/0015218 A1 1/2012 Lee
(Continued)

FOREIGN PATENT DOCUMENTS

CN 103325974 A 9/2013
CN 203192879 U 9/2013
(Continued)

OTHER PUBLICATIONS

Extended European Search Report for European Application No. 21780142.2, dated Apr. 17, 2023.
(Continued)

*Primary Examiner* — Basia A Ridley
*Assistant Examiner* — Jonathan William Estes
(74) *Attorney, Agent, or Firm* — Birch, Stewart, Kolasch & Birch, LLP

(57) ABSTRACT

A battery module includes a module frame into which battery cell stack, in which a plurality of battery cells are stacked, is inserted; end plates for covering front and rear surfaces of the battery cell stack and coupled to the module frame; and a cell terrace assembly located between the battery cell stack and the end plates, wherein a vent is formed in a side surface part of the module frame, and a part in which the vent is formed is formed to be closer to the cell terrace assembly than to the battery cell stack.

10 Claims, 8 Drawing Sheets

(51) Int. Cl.
*H01M 50/233* (2021.01)
*H01M 50/271* (2021.01)

(56) References Cited

U.S. PATENT DOCUMENTS

| | | | | |
|---|---|---|---|---|
| 2013/0252037 | A1 | 9/2013 | Chiba | |
| 2015/0030894 | A1 | 1/2015 | Lee et al. | |
| 2016/0149192 | A1 | 5/2016 | Motokawa | |
| 2018/0026243 | A1 | 1/2018 | Stojanovic et al. | |
| 2018/0212214 | A1 | 7/2018 | Sakal et al. | |
| 2019/0097192 | A1* | 3/2019 | Kim | H01M 50/394 |
| 2019/0123318 | A1* | 4/2019 | Fees | H01M 50/51 |
| 2019/0267591 | A1 | 8/2019 | Park et al. | |
| 2019/0372083 | A1 | 12/2019 | Ryu et al. | |
| 2020/0076025 | A1 | 3/2020 | Jo et al. | |
| 2020/0303701 | A1* | 9/2020 | Kim | H01M 10/0486 |
| 2020/0343499 | A1 | 10/2020 | Yoo et al. | |
| 2020/0350530 | A1 | 11/2020 | Kim et al. | |
| 2021/0194101 | A1 | 6/2021 | Kim et al. | |
| 2021/0226295 | A1 | 7/2021 | Kwon et al. | |

FOREIGN PATENT DOCUMENTS

| | | | | |
|---|---|---|---|---|
| CN | 209658277 | U | 11/2019 | |
| CN | 104347833 | A | 7/2026 | |
| CN | 107644960 | A | 7/2026 | |
| EP | 3 696 878 | A1 | 8/2020 | |
| JP | 2016-134335 | A | 7/2018 | |
| JP | 2018195549 | A * | 12/2018 | H01M 10/613 |
| JP | 2020-501320 | A | 1/2020 | |
| JP | 6645500 | B2 | 1/2020 | |
| JP | 2013-197019 | A | 7/2026 | |
| KR | 10-2009-0002426 | A | 1/2009 | |
| KR | 10-2010-0081942 | A | 7/2010 | |
| KR | 10-2010-0097404 | A | 9/2010 | |
| KR | 10-1106111 | B1 | 1/2012 | |
| KR | 10-2012-0000502 | A | 2/2012 | |
| KR | 10-2019-0070006 | A | 6/2018 | |
| KR | 10-2016-0081015 | A | 7/2018 | |
| KR | 10-2018-0113416 | A | 10/2018 | |
| KR | 10-1908583 | B1 | 10/2018 | |
| KR | 10-2019-0064887 | A | 6/2019 | |
| KR | 20190069131 | A * | 6/2019 | H01M 50/271 |
| KR | 10-2019-0124022 | A | 11/2019 | |
| KR | 10-2019-0122474 | A | 7/2026 | |
| WO | WO 2013/018283 | A1 | 2/2013 | |
| WO | WO 2014/003367 | A1 | 1/2014 | |
| WO | WO 2017/003168 | A1 | 1/2017 | |
| WO | WO 2019/050182 | A1 | 2/2018 | |
| WO | WO 2020/009484 | A1 | 1/2020 | |

OTHER PUBLICATIONS

International Search Report (PCT/ISA/210) issued in PCT/KR2021/001484, dated Jun. 7, 2021.

* cited by examiner

BATTERY PACK INCLUDING A FIRST BATTERY MODULE AND A SECOND BATTERY MODULE

TECHNICAL FIELD

CROSS CITATION WITH RELATED APPLICATION(S)

This application claims the benefit of Korean Patent Application No. 10-2020-0039759 filed on Apr. 1, 2020 in the Korean Intellectual Property Office, the disclosure of which is incorporated herein by reference in its entirety.

The present disclosure relates to a battery module and a battery pack including the same, and more particularly, to a battery module having enhanced stability, and a battery pack including the same.

BACKGROUND ART

As technology development and demands for mobile devices increase, the demand for batteries as energy sources is rapidly increasing. Accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series or in parallel to configure a battery pack, it is common to configure a battery module composed of at least one battery cell first, and then configure a battery pack by using at least one of the battery modules and adding other components. Since the battery cells constituting these middle or large-sized battery modules are composed of chargeable/dischargeable secondary batteries, such a high-output and large-capacity secondary battery generates a large amount of heat in a charging and discharging process.

The battery module includes a battery cell stack in which a plurality of battery cells are stacked, a frame for housing the battery cell stack, and end plates for covering the front and rear surfaces of the battery cell stack.

FIG. 1 is a view illustrating the appearance of a battery module mounted on a conventional battery pack at the time of ignition. FIG. 2 illustrates section 2-2 of FIG. 1 and is a view illustrating the appearance of a flame affecting adjacent battery modules when a battery module mounted on a conventional battery pack ignites.

Referring to FIGS. 1 and 2, the conventional battery module includes a battery cell stack in which a plurality of battery cells 10 are stacked, a frame 20 for housing the battery cell stack, end plates 30 formed on the front and rear surfaces of the battery cell stack, terminal bus bar 40 formed so as to protrude to the outside of the end plates, and the like.

The frame 20 and the end plate 30 can be coupled so as to be sealed by welding. When the frame 20 and the end plate 30 for housing the battery cell stack are coupled in this way, the internal pressure of the battery cells 10 increases during overcharge of the battery module. Thus, when a limit value of the welding strength of the battery cell is exceeded, high-temperature heat, gas, and flame generated in the battery cells 10 can be discharged to the outside of the battery cell 10.

At this time, the high-temperature heat, gas and flame may be discharged through the openings formed in the end plates 30. However, in a battery pack structure in which a plurality of battery modules are arranged so that the end plates 30 face each other, it may affect a battery module located adjacent to battery modules that eject high-temperature heat, gas and flame. Thereby, the terminal bus bar 40 formed on the end plates 30 of the adjacent battery modules may be damaged, and high-temperature heat, gas, and flame may enter the inside of the battery module via the openings formed in the end plates 30 of the adjacent battery modules to damage the plurality of battery cells 10.

DETAILED DESCRIPTION OF THE INVENTION

Technical Problem

It is an object of the present disclosure to provide a battery module capable of dispersing high-temperature heat and flame discharged when an ignition phenomenon occurs in the battery module, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack having a plurality of stacked battery cells, a module frame into which the battery cell stack is inserted; end plates for covering front and rear surfaces of the battery cell stack and coupled to the module frame; and a cell terrace assembly located between the battery cell stack and the end plates, wherein a vent is formed in a side surface part of the module frame, and a portion in which the vent is formed is formed to be closer to the cell terrace assembly than to the battery cell stack.

The vent may be in an area in which the cell terrace assembly is formed.

The vent may be located at opposite ends of a side surface part of the module frame.

A terminal busbar opening and a connector opening may be formed on the end plates, and the vent may disperse and discharge gas and heat emitted from the terminal busbar opening and the connector opening.

The vent may be a hole formed in a side surface of the module frame.

The hole may obliquely pass through the side surface of the module frame.

The end plates may include a first end plate and a second end plate, and the hole has an oblique direction which is directed to an end plate located farther away from the vent, among the first end plate and the second end plate.

The vent may include an inflow port formed in the side surface of the module frame to correspond to a stack surface of the battery cell stack, and a discharge port for discharging gas flown in through the inflow port, and the discharge port may be perpendicular to the inflow port.

The vent may further include a connection part that is formed between the inflow port and the discharge port to guide the gas flown into the inflow port in a direction in which the discharge port is located, and the connection part has a structure in which the module frame is inclined with respect to the side surface part.

The end plates may include a first end plate and a second end plate, and the discharge port is formed toward an end plate located farther away from the vent, among the first end plate and the second end plate.

According to one embodiment of the present disclosure, there is provided a battery pack comprising: two or more of the battery modules, wherein a first battery module and the second battery module of the two or more battery modules each have an opening formed at one side facing each other.

A vent of the first battery module may be formed to discharge gas in a direction away from the second battery module.

Advantageous Effects

According to the embodiments of the present disclosure, a venting part can be formed on the side surface part of the module frame in a portion adjacent to the cell terrace assembly rather than the battery cell stack, thereby dispersing high-temperature heat, gas, and flame generated at the time of ignition of the battery module and so minimizing a damage to the terminal bus bars of the battery module and the portions of plural battery cells facing the battery module.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
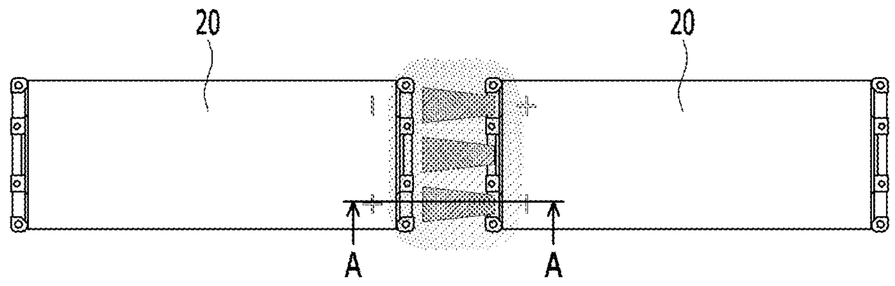
FIG. 1 is a view illustrating the appearance of a battery module mounted on a conventional battery pack at the time of ignition.
Figure 2:
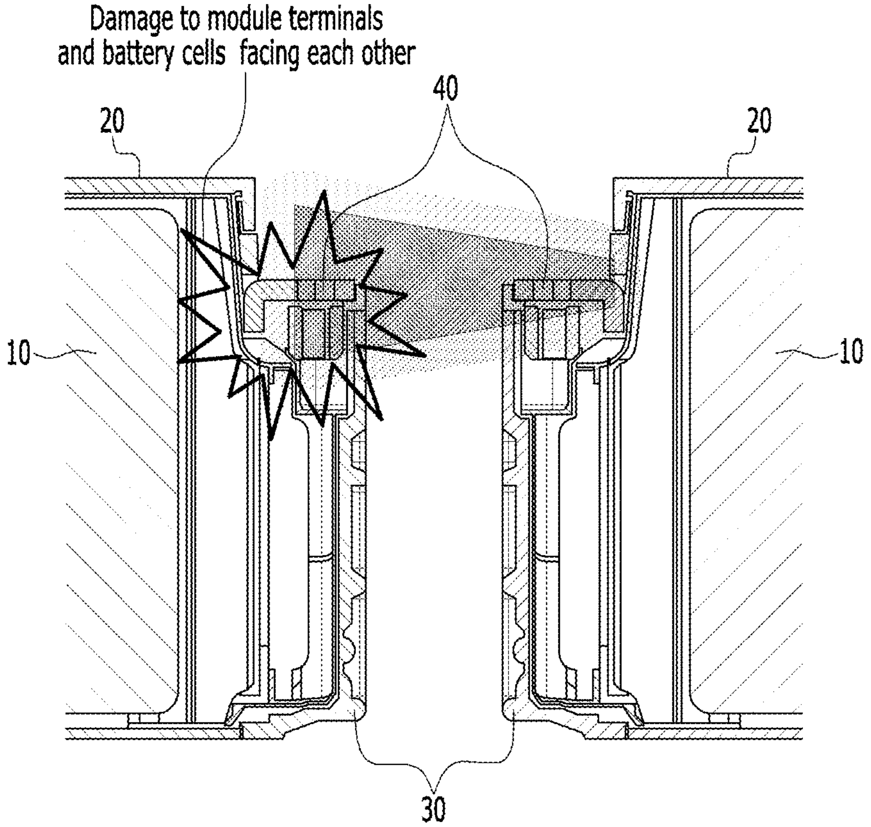
FIG. 2 illustrates a section taken along line 2-2 in FIG. 1 and is a view illustrating the appearance of a flame affecting adjacent battery modules when a battery module mounted on a conventional battery pack ignites.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, the phrase "in a plan view" means when a target object is viewed from the above, and the phrase "in a cross-section view" means when a cross-section taken by vertically cutting a target portion is viewed cut from the side.

Figure 3:
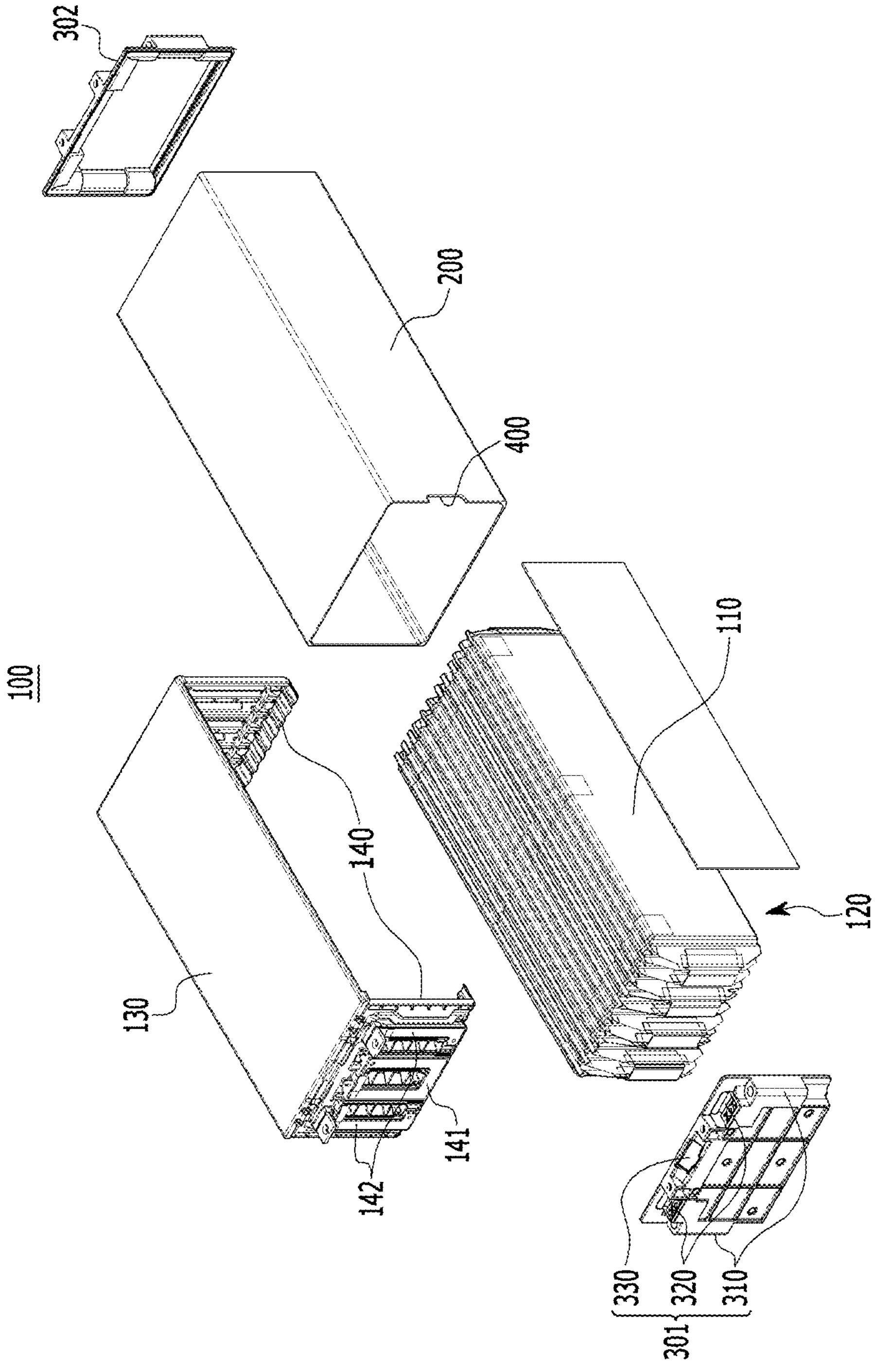
FIG. 3 is an exploded perspective view illustrating a battery module according to an embodiment of the present disclosure.
Figure 4:
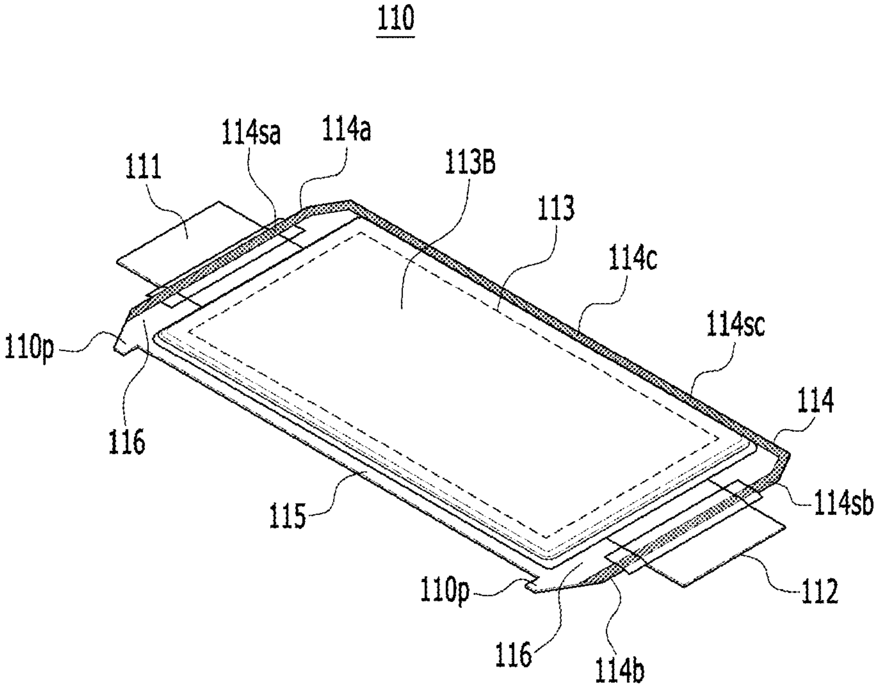
FIG. 4 is a perspective view illustrating the battery cell included in the battery module of FIG. 3.
Figure 5:
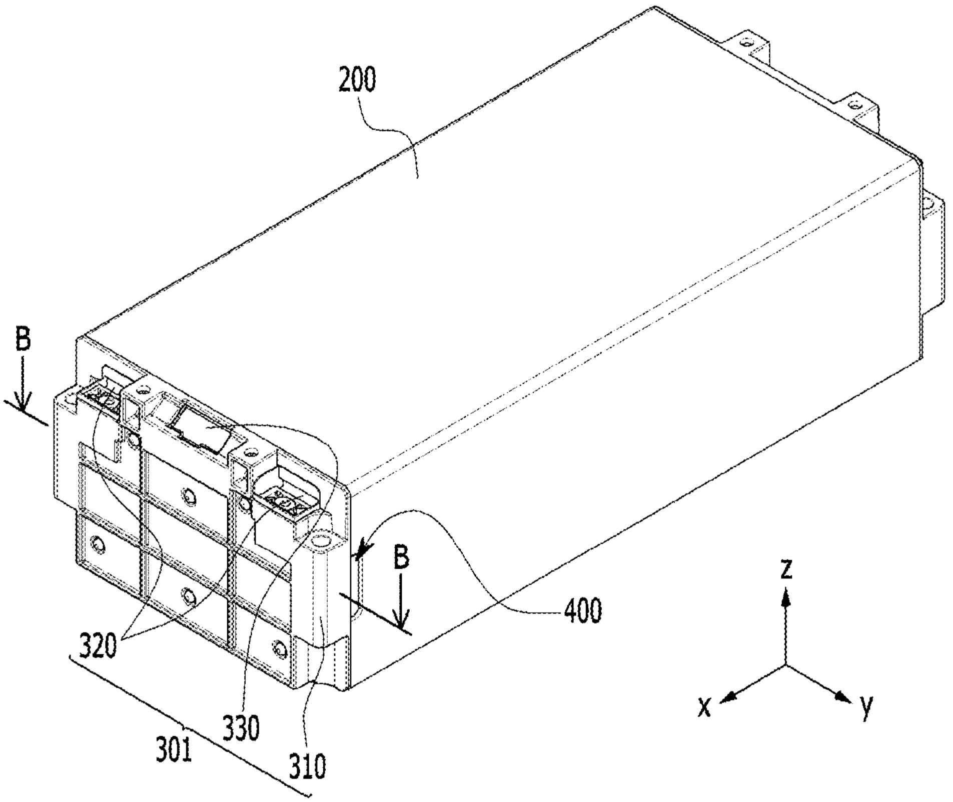
FIG. 5 is a perspective view illustrating a state in which the battery module of FIG. 3 is coupled.
Figure 6:
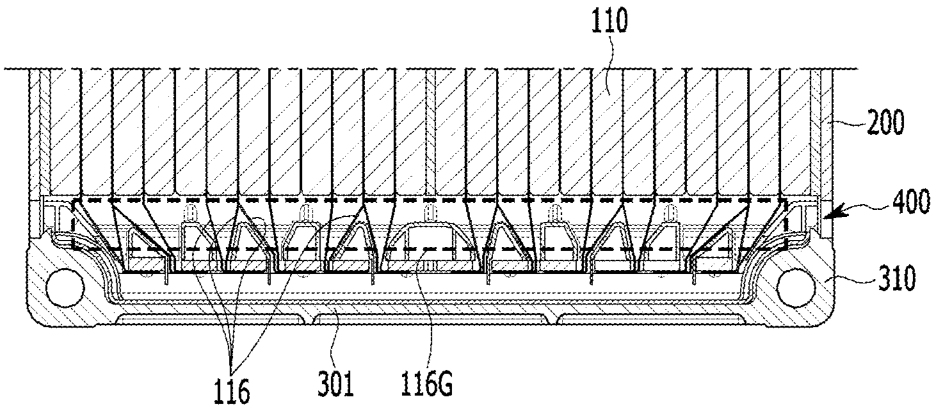
FIG. 6 is a plan view taken along the cutting line 6-6 in FIG. 5.

FIG. 3 is an exploded perspective view illustrating a battery module according to an embodiment of the present disclosure. FIG. 4 is a perspective view illustrating the battery cell included in the battery module of FIG. 3. FIG. 5 is a perspective view illustrating a state in which the battery module of FIG. 3 is coupled. FIG. 6 is a plan view taken along the cutting line 6-6 in FIG. 5. FIG. 6 is a plan view taken along an XY plane of FIG. 5, when viewed in direction B.

Referring to FIGS. 3 to 5, the battery module 100 according to an embodiment of the present disclosure includes a battery cell stack 120 in which a plurality of the battery cells 110 are stacked, and a module frame 200 for housing the battery cell stack 120. A venting part 400 is formed in a side surface part of the module frame 200. The venting part 400 as used herein means a part for discharging heat or gas inside the battery module 100.

Hereinafter, a configuration of one battery cell 110 will be described with reference to FIG. 4.

Referring to FIG. 4, the battery cell 110 may be a secondary battery, and may be configured of a pouch type secondary battery. The battery cell 110 may include an electrode assembly 113, a cell case 114, and electrode leads 111 and 112 protruded from the electrode assembly 113.

The electrode assembly 113 may be composed of a positive electrode plate, a negative electrode plate, a separator, and the like. The cell case 114 is for packaging the electrode assembly 113 and may be formed of a laminate sheet including a resin layer and a metal layer. The cell case 114 may include a case main body 113B and a cell terrace 116.

The case main body 113B may house the electrode assembly 113. To achieve this, a housing space capable of housing the electrode assembly 113 is provided in the case main body 113B. The cell terrace 116 may extend from the case main body 113B and may be sealed so that the electrode assembly 113 can be sealed.

The electrode leads 111 and 112 may be electrically connected to the electrode assembly 113. The electrode leads 111 and 112 may be provided with a pair including a negative electrode lead 111 and a positive electrode lead 112. A part of the pair of the electrode leads 111 and 112 may be protruded from a front side (+X-axis direction) and a rear side (−X-axis direction) of the cell case 114 to the outside of the cell terrace 116, respectively.

Meanwhile, the battery cell 110 may be manufactured by sealing both ends 114*a* and 114*b* of the cell case 114 and one side part 114*c* for connecting these ends in a state where the electrode assembly 113 is housed in the cell case 114. That is, the battery cell 110 according to the embodiment of the present disclosure includes a total of three sealing parts 114*sa,* 114*sb,* and 114*sc,* the sealing parts 114*sa,* 114*sb,* and 114*sc* have a structure capable of being sealed by a method such as heat fusion, and the remaining other side part may be composed of a connection part 115.

Further, the connection part 115 may be extended long along one periphery of the battery cell 110, and a protrusion 110*p* of the battery cell 110, which is called as bat-ear, may be formed at an end of the connection part 115. Further, the cell case 114 may be sealed at an interval between the protruded electrode leads 111 and 112.

The configuration of the battery cell 110 as described above is one example, and the shape of the battery cell 110 for constituting the battery cell stack may be variously modified.

The battery cells 110 may be formed of a plurality of cells, and the plurality of the battery cells 110 may be stacked to be electrically connected to each other, thereby forming the battery cell stack 120. An upper plate 130 may be located on an upper side of the battery cell stack 120, and busbar frames 140 may be located on a front surface and a rear surface of the battery cell stack 120, which are directions in which the electrode leads 111 and 112 are protruded, respectively. The battery cell stack 120, the upper plate 130 and the busbar frame 140 may be housed together in the module frame 200.

A thermally conductive resin can be injected between the battery cell stack 120 and a lower surface of the module frame 200, and a thermally conductive resin layer (not illustrated) can be formed between the battery cell stack 120 and the lower surface of the module frame 200, through the injected thermally conductive resin. Through the module frame 200, the battery cell stack 120 housed in the interior the module frame 200 and components connected thereto can be protected from a physical impact of the outside.

The busbar frames 140 are located on the front surface and the rear surface of the battery cell stack 120, respectively, to guide connection of the battery cell stack 120 and an external device simultaneously while covering the battery cell stack 120. In detail, a busbar 141 and a terminal busbar 142 can be mounted on the busbar frame 140. The electrode leads 111 and 112 of the battery cell 110 pass through a slit formed in the busbar frame 140 and then are curved so that they can be joined to the busbar 141 and the terminal busbars 142. The battery cells 110 constituting the battery cell stack 120 may be connected in series or in parallel through the busbar 141, and the external device or circuit and the battery cells 110 may be connected through the terminal busbars 142 exposed to the outside of the battery module 100. Further, a connector (not illustrated) may be mounted on the busbar frame 140, and a temperature or voltage data of the battery cell 110 measured through a sensing assembly (not illustrated) can be transmitted to an external BMS (battery management system) or the like through a connector (not illustrated).

End plates 301 and 302 are formed so as to cover the front surface and the rear surface of the battery cell stack 120. A mounting part 310 for coupling to a pack frame is formed in each of the end plates 301 and 302. In detail, a first end plate 301 and a second end plate 302 may be located on the front surface and the rear surface of the battery cell stack 120, respectively. The end plates 301 and 302 can protect the busbar frame 140 and plural electronic components connected thereto from external impact and need to have a predetermined strength to achieve this and may include a metal such as aluminum.

A terminal busbars opening 320 and a connector opening 330 for allowing the terminal busbars 142 and the connector (not illustrated) mounted on the busbar frame 140 to connect with the outside are formed in the end plates 301 and 302, and gas or heat generated from the battery cell 110 can be discharged to the outside of the battery module 100 through the openings 320 and 330. The end plates 301 and 302 and the module frame 200 are coupled by welding, and the plurality of battery cells 110 located inside the module frame 200 and the end plates 301 and 302 can be interrupted from being connected with the outside except for the above-mentioned openings 320 and 330, through the coupling structure of the end plates 301 and 302 and the module frame 200 sealed by welding.

The conventional battery module can discharge high-temperature heat, gas or flame, which are generated from the battery cells, through openings, as described above. However, in a battery pack structure in which the plurality of battery module are disposed such that the end plates face each other, high-temperature heat, gas and flame, which are discharged from the battery module, may damage adjacent battery modules.

Thus, the venting part 400 can be formed in the side surface part of the module frame 200 according to the embodiment of the present disclosure to disperse heat, gas, flame and the like, which are discharged through the openings 320 and 330. The venting part 400 may have a hole structure which is formed in a side surface part of the module frame 200. The hole structure according to the embodiment of the present disclosure may have a shape in which an end of a side surface part of the module frame 200 is partially cut, as illustrated in FIGS. 3 and 5.

Through the venting part 400, the discharge path of the interior of the battery module 100 can be diversified, thereby preventing a phenomenon in which the discharge is concentrated to only a part of the battery module 100 at the time of ignition, and dispersing the discharge of high-temperature heat, gas and flame.

Further, Referring to FIGS. 5, and 6, the venting part 400 according to the embodiment of the present disclosure is formed at a location corresponding to a portion in which the cell terrace 116 of the battery cell 110 is located. In the battery cell 110, a large amount of heat is generated from the electrode leads 111 and 112, and the cell terraces 116 adjacent thereto. While the cell terraces 116 are unsealed due to a change in pressure change inside the battery module 100, high-temperature heat, gas and flame can be discharged. In this case, the venting part 400 according to this embodiment can be formed at a location corresponding to the cell terrace 116 to immediately discharge high-temperature heat, gas, and flame to the outside of the battery module 100. In detail, as the battery cells 110 constituting the battery cell stack may be formed of a plurality of cells, the cell terraces 116 may be formed of a plurality of terraces to form a cell terrace assembly 116G. The venting part 400 may be formed in the side surface part of the module frame 200, which corresponds to the cell terrace assembly 116G. The portion in which the venting part 400 according to this embodiment is formed may be formed to be adjacent to the cell terrace assembly 116G rather than to the battery cell stack 120. As an example, the venting part 400 may be formed at the location corresponding to the cell terrace assembly 116G.

Although not illustrated, the venting part may be additionally formed to be adjacent to the second end plate 302. At this time, the additionally formed venting part may be formed so as to discharge gas in a direction of the first end plate 301.

Hereinafter, a venting part according to modified embodiments of the present disclosure will be described with reference to FIGS. 7 to 9.

Figure 7:
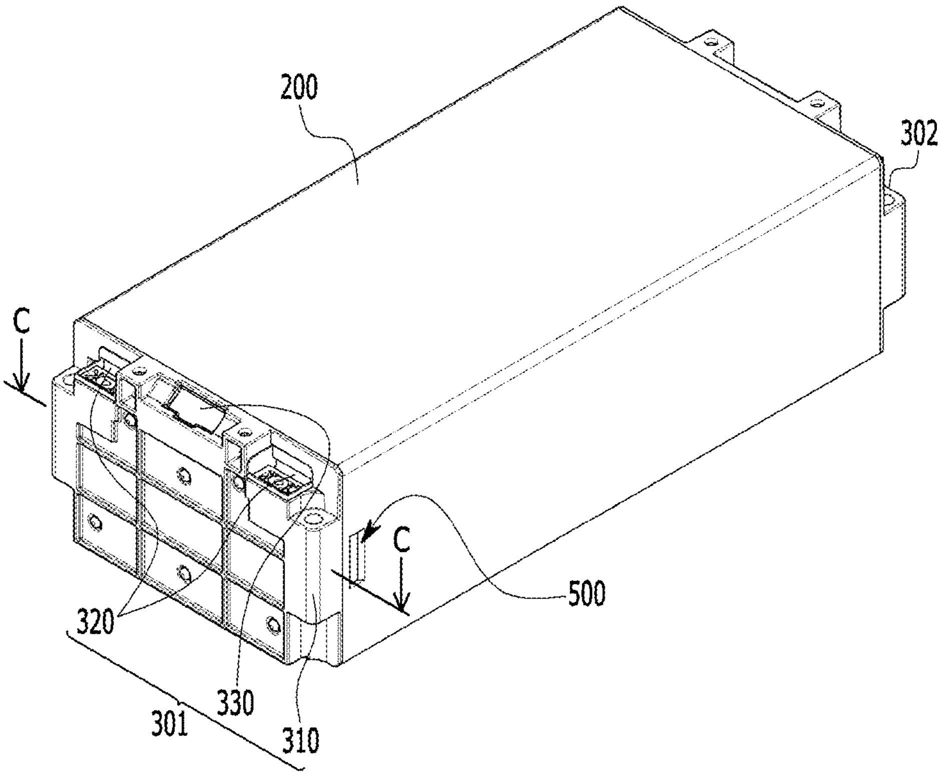
FIG. 7 is a perspective view illustrating a battery module according to another embodiment of the present disclosure.

FIG. 7 is a perspective view illustrating a battery module according to another embodiment of the present disclosure. FIG. 8 is a plan view taken along the cutting line 8-8 in FIG. 7. FIG. 8 is a plan view taken along an XY plane of FIG. 7, when viewed in a when viewed in a direction of line 8-8. FIG. 9 is a perspective view illustrating a battery module according to another embodiment of the present disclosure.

Figure 9:
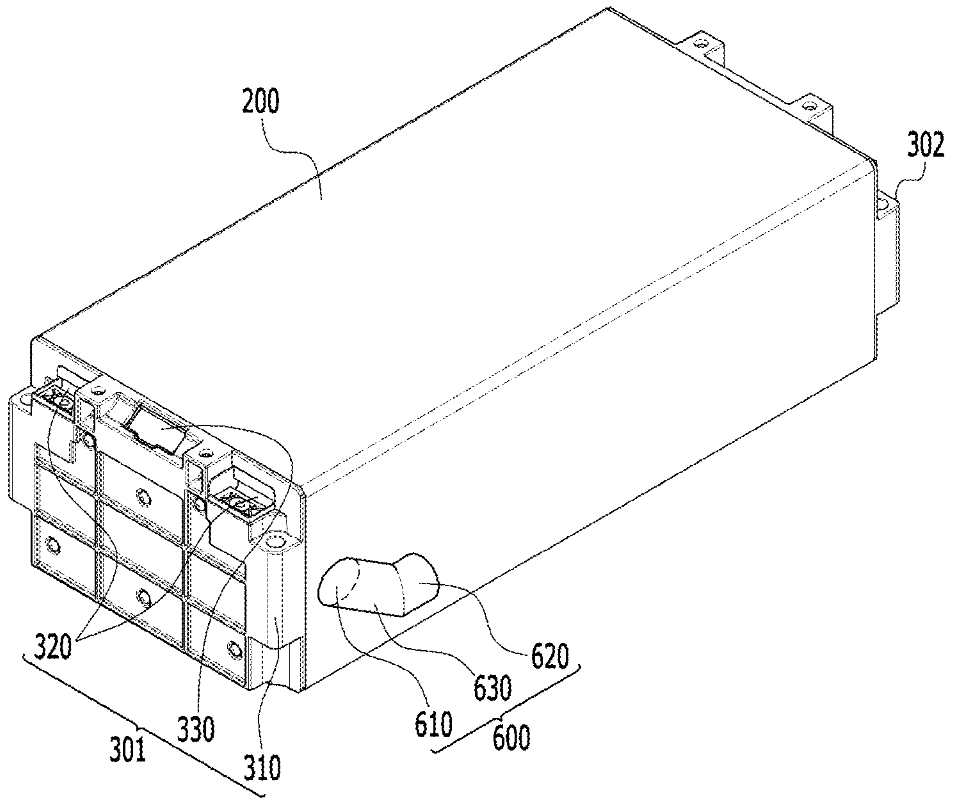
FIG. 9 is a perspective view illustrating a battery module according to another embodiment of the present disclosure.

Referring to FIGS. 7 and 9, venting parts 500 and 600 according to the present embodiments can be formed so as to discharge gas toward an end plate located farther away from the venting part 500, among a first end plate 301 and a second end plate 302. As illustrated in FIGS. 7 and 9, the venting parts 500 and 600 located closer to the first end plate 301 can be formed so as to discharge gas in a direction of the second end plate 302 located farther away therefrom. Although not illustrated, the venting part 500 may be additionally formed to be adjacent to the second end plate 302. At this time, the additionally formed venting part can be formed so as to discharge gas in a direction of the first end plate 301.

The venting parts 500 and 600 are formed at the locations corresponding to portions in which the cell terraces 116 are located, but the first end plate 301 is closer to the battery cell stack 120 than the second end plate 302 located on an opposite side part relative to the battery cell stack 120, so that when gas is discharged in a direction of the first end plate 301, high-temperature heat, gas, and flame are discharged to another battery module adjacent to the first end plate 301 to damage the another battery module. In order to prevent this, the venting part 500 is preferably formed so as to discharge gas only in a direction of the second end plate 302. This will be described below in FIG. 10 again.

Figure 8:
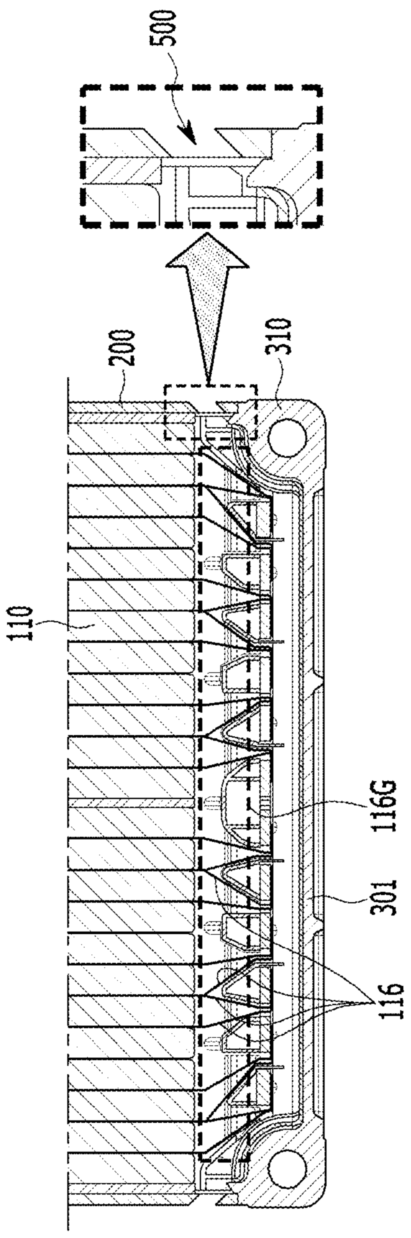
FIG. 8 is a plan view taken along the cutting line 8-8 in FIG. 7.

Referring to FIGS. 7 and 8, the venting part 500 according to the embodiment of the present disclosure has a hole structure which is formed in a side surface part of the module frame 200, and, unlike the venting part 400 according to the embodiment described in FIG. 5, the hole may be formed to be spaced apart from an end of the side surface part of the module frame 200 by a fixed interval. Moreover, the venting part 500 according to the embodiment of the present disclosure may have a hole structure for obliquely penetrate the side surface part of the module frame 200. Here, the hole structure has an oblique direction which is closer to an end plate located farther away from the venting part 500, among the first end plate 301 and the second end plate 302.

In detail, an inner inflow port of the obliquely penetrated venting part 500 may be formed to be closer to the first end plate 301 than an outer discharge port, and the outer discharge port may be formed to be closer to the second end plate 302 than the inner inflow port.

Through the structure as described above, directionality can be naturally given to heat or gas discharged through the venting part 500. That is, the venting part 500 can guide so as to discharge gas in a direction of the second end plate 302 located farther away therefrom, thereby preventing a damage of another battery module that is adjacent to the first end plate 301 through this.

Further, the venting part 500 according to the embodiment of the present disclosure has the advantages in that it has a penetrated hole structure, does not require a separate additional space, and can simply give the directionality of the discharged gas only by penetrating the module frame 200.

Next, referring to FIG. 9, the venting part 600 may include an inflow port 610 that is formed in a side surface part of the module frame 200 to face one surface of the battery cell along a stacking direction of a battery cell stack, a discharge port 620 for discharging gas flown in through the inflow port 610, and a connection part 630 for connecting the inflow port 610 and the discharge port 620.

The discharge port 620 may be formed in a direction that is perpendicular to the inflow port 610. Further, the connection part 630 may have a shape which is protruded from the side surface part of the module frame 200, and may be formed in an inclined manner.

Based on the structure as described above, the venting part 600 according to the embodiment of the present disclosure can more securely guide heat or gas of the interior of the battery module in a direction of the second end plate 302. That is, it has the advantage that the directionality of heat or gas can be given more securely. Further, the connection part 630 can act as a kind of a cover to interrupt external spatters from entering the interior of the battery module.

Meanwhile, the number of the above-mentioned venting parts 400, 500, and 600 according to the embodiment of the present disclosure is not specially limited, and may be formed of one or a plurality of the venting parts. However, when the venting parts 400, 500, and 600 are formed of the plurality of venting parts, they may be arranged along the direction that is perpendicular to the side surface part of the module frame 200 so as to correspond to the locations of the cell terraces 116 constituting the battery cell stack 120. Here, the direction that is perpendicular to the side surface part of the module frame 200 means a direction that is parallel to Z-axis in FIG. 5.

Referring to FIG. 3 again, the module frame 200 according to the present disclosure may be a structure of a mono frame or a structure in which an upper cover is coupled to a U-shaped frame. First, the mono frame may be in the form of a metal plate, of which an upper surface, a lower surface, and both side surfaces are integrated, and may be manufactured through extrusion molding. Next, in a case of structure in which the upper cover is coupled to the U-shaped frame, it may be formed by coupling the upper cover onto an upper side of the U-shaped frame which is a metal plate in which a lower surface, and both side surfaces are integrated, and may also be manufactured by press molding.

As illustrated in FIG. 5 or 7, the venting parts 400 and 500 of a hole structure can be applied to both of the mono frame manufactured by the extrusion molding or the U-shaped frame manufactured by the press molding. Meanwhile, as illustrated in FIG. 9, the venting part 600 of a protruded structure is easier to implement in the U-shaped frame manufactured by the press molding than in the mono frame manufactured by the extrusion molding. However, in forming the venting part 600 of the protruded structure, it may be formed by forming a hole penetrated in a side surface part of the module frame 200 and joining the connection part 630 and the discharge port 620 to the side surface part of the module frame 200. In this case, the venting part 600 can be applied even to the mono frame manufactured by extrusion molding.

Figure 10:
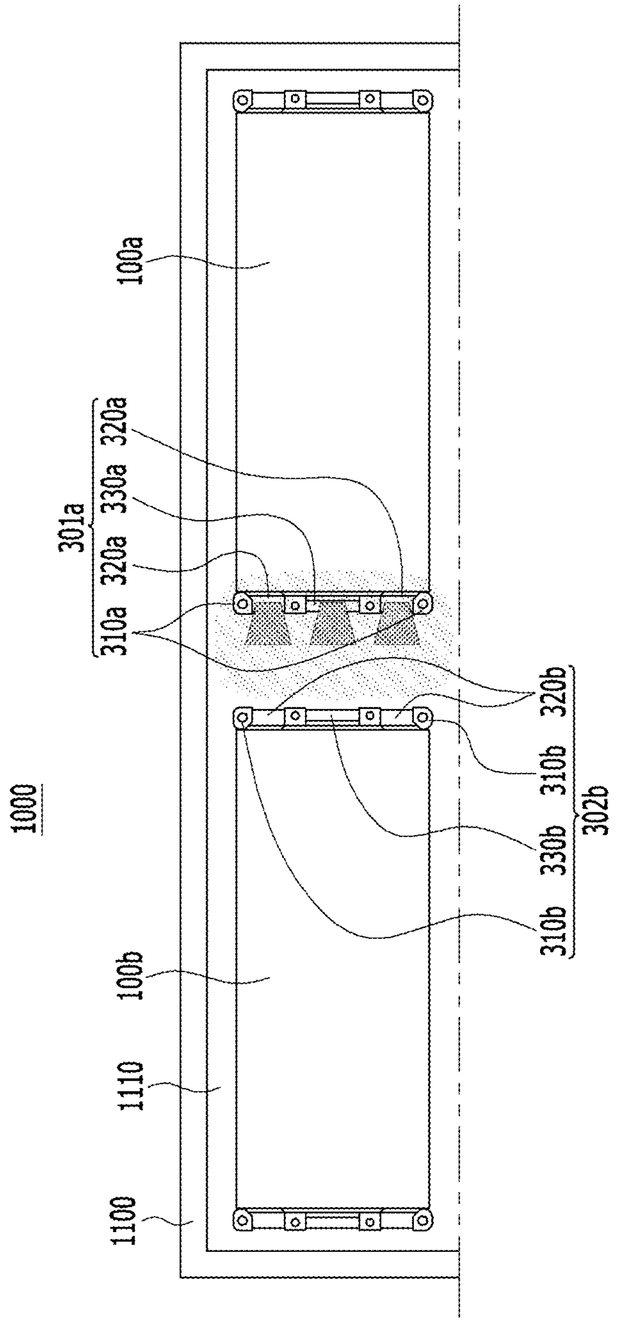
FIG. 10 is a plan view illustrating a battery pack 1000 according to an embodiment of the present disclosure when viewed from above.

FIG. 10 is a plan view illustrating a battery pack 1000 according to an embodiment of the present disclosure when viewed from above.

Referring to FIG. 10, the battery pack 1000 according to an embodiment of the present disclosure may include two or more of the battery modules 100*a* and 100*b* as described above.

The battery modules 100*a* and 100*b* may be housed in a pack frame 1100 and may be mounted together with various control and protection systems such as a BMS (battery management system), a cooling system, and the like.

A first battery module 100*a* and a second battery module 100*b* each may have openings 320*a*, 330*a*, 320*b*, and 330*b* formed on one side facing each other.

In detail, a first end plate 301*a* of the first battery module 100*a* and a second end plate 302*b* of the second battery module 100*b* may face each other. At this time, a terminal busbar opening 320*a* and a connector opening 330*a* may be formed in the first end plate 301*a*, and a terminal busbar opening 320*b* and a connector opening 330*b* may be formed in the second end plate 302*b*.

The battery modules 100*a* and 100*b* according to the embodiment of the present disclosure can provide the above-mentioned venting part in a side surface part of the module frame, thereby reducing heat, gas, flame, and the like discharged through the openings 320*a*, 330*a*, 320*b*, and 330*b*.

Further, the venting parts 500 and 600 illustrated in FIGS. 7 and 9 may be provided in the first battery module 100*a*, and accordingly, can guide so as to discharge heat, gas, flame, and the like in a direction that is opposite to a direction in which the second battery module 100*b* is located. That is, a damage that may applied to the second battery module 100*b* can be minimized.

The battery modules 100*a* and 100*b* according to the embodiment of the present disclosure may be spaced apart from a side surface part 1110 of the pack frame 1100. Although not illustrated, the battery module 100*a* and 100*b* may have a support member formed between the side surface part of the module frame 200 and the pack frame 1100. The support member can prevent the battery modules 100*a* and 100*b* from moving in the interior of the pack frame 1100.

The battery module and the battery pack according to this embodiment as described above can be applied to various devices. These devices may be applied to transportation means such as an electric bicycle, an electric vehicle, a hybrid vehicle, but the present disclosure is not limited thereto and can be applied to various devices that can use the battery module, which also falls under the scope of the present disclosure.

Although the preferred embodiments of the present disclosure have been illustrated and described, the present disclosure is not limited to the above-described particular embodiments, various modifications and improvements can be made by those skilled in the art without departing from the scope and spirit as disclosed in the accompanying claims, and these modifications and improvements should not be understood separately from the scope and spirit of the invention.

DESCRIPTION OF REFERENCE NUMERALS

116: cell terrace
116G: cell terrace assembly
200: module frame
301, 302: end plate
400, 500, 600: venting part

The invention claimed is:

1. A battery pack comprising:
a first battery module and a second battery module,
wherein each of the first battery module and the second battery module comprises:
a battery cell stack having a plurality of stacked battery cells;
a module frame into which the battery cell stack is inserted;
end plates comprising a first end plate and a second end plate for covering front and rear surfaces of the battery cell stack respectively and coupled to the module frame; and
a cell terrace assembly located between the battery cell stack and the end plates,
wherein a vent is formed in a side surface of the module frame, and a portion in which the vent is formed is formed to be closer to the cell terrace assembly than to the battery cell stack,
wherein the first end plate of the first battery module and the second end plate of the second battery module each have an opening,
wherein the first end plate of the first battery module and the second end plate of the second battery module face each other, and
wherein an outlet of the vent of the first battery module discharges gas in a direction away from the second battery module and towards the second end plate of the first battery module, and an outlet of the vent of the second battery module discharges gas in a direction away from the first battery module and towards the first end plate of the second battery module.

2. The battery pack according to claim 1, wherein the vent is in an area in which the cell terrace assembly is formed.

3. The battery pack according to claim 1, wherein the vent includes a plurality of holes, and
wherein each of the plurality of holes is located at opposite ends of the side surface of the module frame.

4. The battery pack according to claim 1, wherein a terminal busbar opening and a connector opening are formed in the end plates, and the vent disperses and discharges gas and heat emitted from the terminal busbar opening and the connector opening.

5. The battery pack according to claim 1, wherein the vent is a hole in the side surface of the module frame.

6. The battery pack according to claim 5, wherein the hole obliquely passes through the side surface of the module frame.

7. The battery pack according to claim 6, wherein the hole has an oblique direction which is directed to an end plate located farther away from the vent, among the first end plate and the second end plate.

8. The battery pack according to claim 1, wherein the vent comprises:

an inflow port formed in the side surface of the module frame to correspond to a stack surface of the battery cell stack, and a discharge port spaced outwardly from the side surface forming the outlet for discharging gas flown in through the inflow port, and wherein the discharge port is perpendicular to the inflow port.

9. The battery pack according to claim 8, wherein the vent further comprises:

a connector formed between the inflow port and the discharge port to guide the gas flown toward the discharge port, and wherein the connector is inclined with respect to the side surface.

10. The battery pack according to claim 8, wherein the discharge port is formed toward an end plate located farther away from the vent, among the first end plate and the second end plate.

* * * * *